(12) United States Patent
Grubish et al.

(10) Patent No.: US 11,899,263 B2
(45) Date of Patent: Feb. 13, 2024

(54) TERMINAL CLOSURE

(71) Applicant: PREFORMED LINE PRODUCTS CO., Mayfield Village, OH (US)

(72) Inventors: Chris Grubish, Solon, OH (US); Matt Becker, Mentor, OH (US); Cameron Clines, Chagrin Falls, OH (US)

(73) Assignee: PREFORMED LINE PRODUCTS CO., Mayfield Village, OH (US)

( * ) Notice: Subject to any disclaimer, the term of this patent is extended or adjusted under 35 U.S.C. 154(b) by 0 days.

(21) Appl. No.: 17/673,436

(22) Filed: Feb. 16, 2022

(65) Prior Publication Data

US 2022/0260801 A1    Aug. 18, 2022

Related U.S. Application Data

(60) Provisional application No. 63/149,822, filed on Feb. 16, 2021.

(51) Int. Cl.
*G02B 6/44* (2006.01)
*G02B 6/38* (2006.01)

(52) U.S. Cl.
CPC ......... *G02B 6/4471* (2013.01); *G02B 6/3849* (2013.01)

(58) Field of Classification Search
CPC ... G02B 6/4447; G02B 6/4453; G02B 6/3849
See application file for complete search history.

(56) References Cited

U.S. PATENT DOCUMENTS

| | | | |
|---|---|---|---|
| 5,042,901 A | 8/1991 | Merriken et al. | |
| 7,013,074 B2 | 3/2006 | Battey et al. | |
| 7,869,681 B2 | 1/2011 | Battey et al. | |
| 2010/0284662 A1* | 11/2010 | Reagan | G02B 6/3885 385/135 |

\* cited by examiner

*Primary Examiner* — Sung H Pak
(74) *Attorney, Agent, or Firm* — COOPER LEGAL GROUP LLC

(57) ABSTRACT

A terminal closure to enclose a drop connection. A closure base and a closure cover mate to define an interior space of the terminal closure. A movable cap is located on the closure cover. While in a closed position, the cap and an associated portion of the closure cover bound a volume. A grommet is located within the volume. The grommet includes an internal bore to receive a plug or a drop cable. The grommet has an outer periphery boundary that is at least as large as the volume bounded by the cap and the portion of the closure cover such that the grommet is sealingly engaged by the cap and the portion of the closure cover when the cap is in the closed position. There may be a plurality of port openings arranged in rows, each row being at a respective, different distance from a mount side wall.

18 Claims, 9 Drawing Sheets

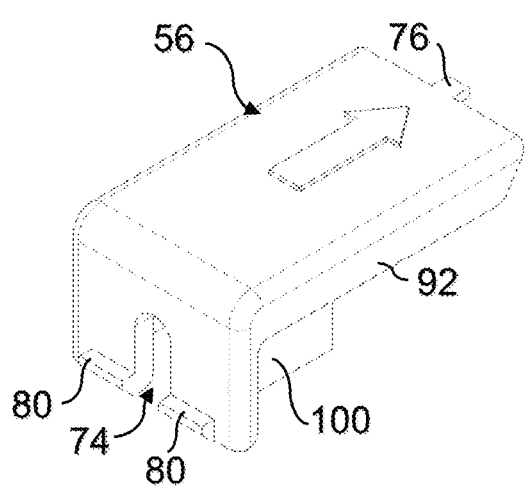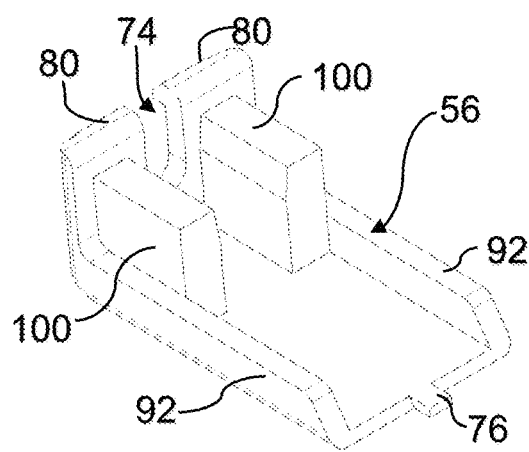
FIG. 19          FIG. 20
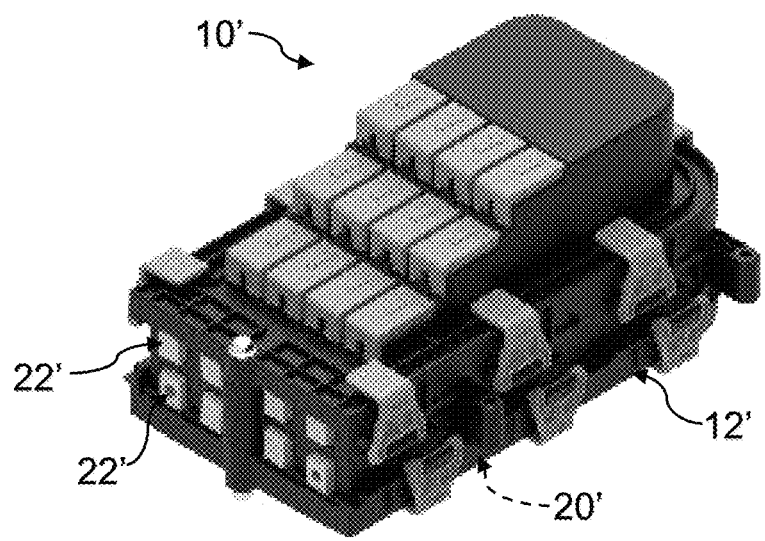
FIG. 21

TERMINAL CLOSURE

RELATED APPLICATION

Benefit is claimed from U.S. Patent Application No. 63/149,822, filed Feb. 16, 2021, the entire contents and disclosure of such application are incorporated, in entirety, herein by reference.

FIELD

The present disclosure relates generally to terminal closures, sometimes referred to as drop boxes, and associated methods, for use in communications, such as fiber optic communications.

Moreover, the present disclosure is directed to a waterproof and airtight optical terminal closure. Terminal closures of the type under consideration are particularly suited for enclosing and housing fiber optic cables such as loose buffer and unitube type cables. However, the terminal closures could equally well be used with other types of cables or wires such as, for example, hybrid cables including copper wire, twisted pair wire, or co-axial cables.

BACKGROUND

A terminal closure (e.g., a drop box) is a relatively light and compact wall, or other surface, mountable enclosure (e.g., mountable to a structure) for termination/connection of communication cables (e.g., lines, fibers, wires or the like).

Such a drop box may be used at a distribution point and/or a building entry point for the communications cables. Within such a drop box, fusion splicing, direct termination, patching or the like may be performed and the drop box provides housing and thus protection for such. Often, splitting also occurs within the drop box. In some instances, the drop box is a network interface unit connecting a location/area to an overall network.

Service providers (i.e., communication companies) may provide fiber optic links, or similar, directly to a home, business, apartment, etc. In order for service providers to keep infrastructure costs low, a terminal closure is used to allow for ease of initial installation into service, and time savings for adding (linking) individual subscribers. Adding an individual subscriber is commonly referred to as a drop. When an individual subscriber is to be connected, skilled personnel enter the enclosure to add the new service (a drop cable), thereby connecting the individual subscriber to an existing fiber optic or similar cable (i.e., a feed cable) disposed in the terminal closure.

BRIEF SUMMARY

The following presents a simplified example summary in order to provide a basic understanding of some aspects of the present disclosure. This summary is not an extensive overview of the present disclosure. It is intended to neither identify key or critical elements nor delineate the scope of the present disclosure. Its sole purpose is to present some concepts of the present disclosure in a simplified form as a prelude to the more detailed description that is presented later.

In accordance with some aspects, the present disclosure provides a terminal closure to enclose a drop connection. The terminal closure includes a closure base partially defining an interior space of the terminal closure. The closure base includes a point of entry for a feed cable to enter into the interior space of the terminal closure. The terminal closure includes a closure cover mating with the closure base. The closure cover and the closure base define the interior space of the terminal closure. The interior space is for a drop connection. The closure cover has a port opening. The port opening provides an accessible pathway between the interior space of the terminal closure and an exterior of the terminal closure. The terminal closure includes a cap located on the closure cover. The cap corresponds to the port opening of the closure cover, the cap being movable between an open position and a closed position. While in the closed position, the cap and an associated portion of the closure cover bound a volume adjacent to the port opening. The volume bounded by the cap and the associated portion of the closure cover have a boundary dimension. The terminal closure includes a grommet at least partially located within the volume adjacent to the port opening. The grommet includes an internal bore to receive one of a plug or a drop cable extending through the grommet. The grommet has an outer periphery boundary dimension that is at least a large as the boundary dimension of the volume bounded by the cap and the associated portion of the closure cover such that the grommet is sealingly engaged by the cap and the associated portion of the closure cover when the cap is in the closed position.

In accordance with some aspects, the present disclosure provides a terminal closure to enclose drop connections. The terminal closure includes a closure base partially defining an interior space of the terminal closure. The closure base includes a point of entry for a feed cable to enter into the interior space of the terminal closure. The closure base includes a mount side wall. The closure base includes a portion for receiving a fastener to attach the closure base to a mount object with the mount side wall engaged against the mount object. The terminal closure includes a closure cover mated with the closure base. The closure cover and the closure base define the interior space of the terminal closure. The interior space is for drop connections. The closure cover has a plurality of port opening. Each port opening provides a respective accessible pathway between the interior space of the terminal closure and an exterior of the terminal closure. The port openings are arranged in a plurality of rows. Each row is at a respective distance from the mount side wall. The plurality of rows proceeds in a sequence. The respective distance from the mount side wall of each successive row in the sequence is greater than the respective distance from the mount side wall of a preceding row in the sequence. The terminal closure includes a plurality of receiving and securing structures at the plurality of port openings. Each receiving and securing structure receives and secures a respective drop cable that extends through a respective port opening.

In accordance with some aspects, the present disclosure provides a terminal closure to enclose a drop connection. The terminal closure includes a closure base partially defining an interior space of the terminal closure. The closure base includes a point of entry for a feed cable to enter into the interior space of the terminal closure. The terminal closure includes a closure cover mating with the closure base. The closure cover and the closure base define the interior space of the terminal closure. The interior space is for a drop connection. The closure cover has a port opening. The port opening provides an accessible pathway between the interior space of the terminal closure and an exterior of the terminal closure. The terminal closure includes a grommet at least partially located adjacent to the port opening. The grommet includes an internal bore to receive one of a plug or a drop cable extending through the grommet. The terminal closure includes a cap located on the closure cover. The cap corresponds to the port opening of the closure cover and the cap corresponds to the grommet. The cap is movable between an open position and a closed position. The cap applies force to the grommet during movement of the cap to the closed position such that the grommet seals the port opening.

BRIEF DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

FIG. 19 is an enlarged, first angle view of the example cap.

FIG. 20 is an enlarged, second angle, inverted, view of the example cap.

FIG. 21 is a perspective illustration of another example terminal closure in accordance within some aspects of the present disclosure, the show example includes a relatively larger closure base that has a relatively increased ability to receive multiple feed cables.

DETAILED DESCRIPTION

Figure 1:
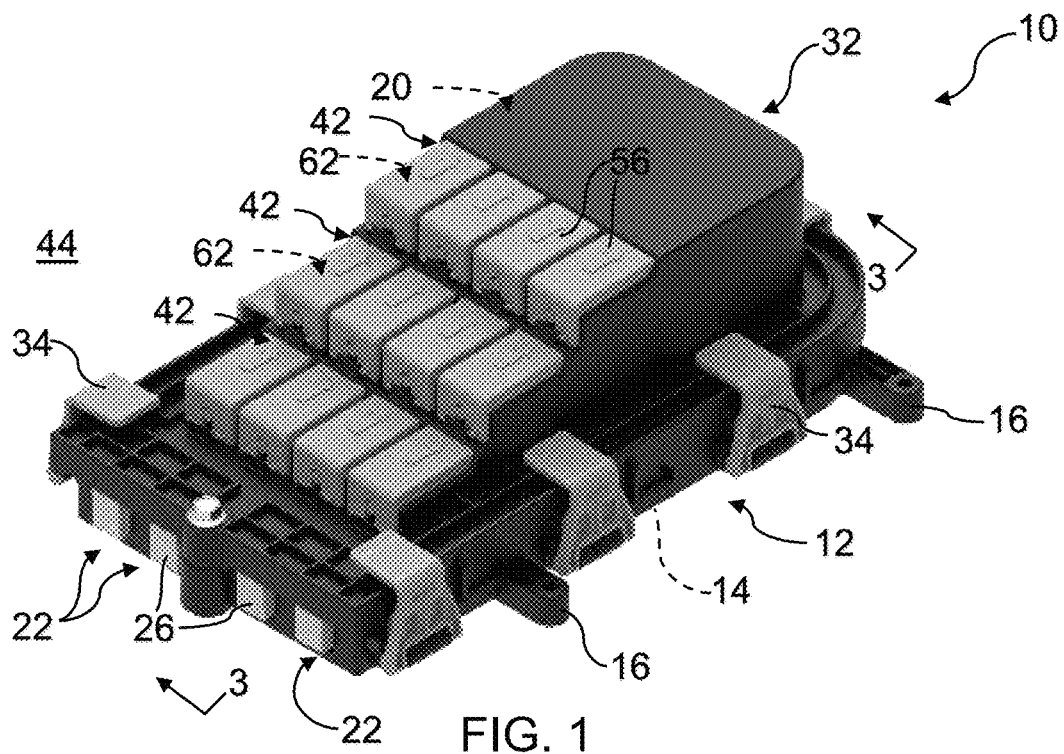
FIG. 1 is a perspective illustration of an example terminal closure in accordance within some aspects of the present disclosure, wherein the shown example includes several example caps in accordance within some aspects of the present disclosure and showing an example stair-step arrangement in accordance within some aspects of the present disclosure.

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

Certain terminology is used herein for convenience only and is not to be taken as a limitation on the disclosed subject matter. Relative language used herein is best understood with reference to the drawings, in which like numerals are used to identify like or similar items. Further, in the drawings, certain features may be shown in somewhat schematic form.

The following subject matter may be embodied in a variety of different forms, such as methods, devices, components, and/or systems. Accordingly, this subject matter is not intended to be construed as limited to any illustrative embodiments set forth herein as examples. Rather, the embodiments are provided herein merely to be illustrative.

Provided herein are examples of terminal closures, also known as drop boxes, in accordance with the present disclosure.

Within an example, a terminal closure encloses a drop connection. The terminal closure includes a closure base partially defining an interior space of the terminal closure. The closure base includes a point of entry for a feed cable to enter into the interior space of the terminal closure. The terminal closure includes a closure cover mating with the closure base. The closure cover and the closure base define the interior space of the terminal closure. The interior space is for a drop connection. The closure cover has a port opening. The port opening provides an accessible pathway between the interior space of the terminal closure and an exterior of the terminal closure. The terminal closure includes a cap located on the closure cover. The cap corresponds to the port opening of the closure cover, the cap being movable between an open position and a closed position. While in the closed position, the cap and an associated portion of the closure cover bound a volume adjacent to the port opening. The volume bounded by the cap and the associated portion of the closure cover have a boundary dimension. The terminal closure includes a grommet at least partially located within the volume adjacent to the port opening. The grommet includes an internal bore to receive one of a plug or a drop cable extending through the grommet. The grommet has an outer periphery boundary dimension that is at least a large as the boundary dimension of the volume bounded by the cap and the associated portion of the closure cover such that the grommet is sealingly engaged by the cap and the associated portion of the closure cover when the cap is in the closed position.

Within an example, a terminal closure encloses a drop connections. The terminal closure includes a closure base partially defining an interior space of the terminal closure. The closure base includes a point of entry for a feed cable to enter into the interior space of the terminal closure. The closure base includes a mount side wall. The closure base includes a portion for receiving a fastener to attach the closure base to a mount object with the mount side wall engaged against the mount object. The terminal closure includes a closure cover mated with the closure base. The closure cover and the closure base define the interior space of the terminal closure. The interior space is for drop connections. The closure cover has a plurality of port opening. Each port opening provides a respective accessible pathway between the interior space of the terminal closure and an exterior of the terminal closure. The port openings are arranged in a plurality of rows. Each row is at a respective distance from the mount side wall. The plurality of rows proceeds in a sequence. The respective distance from the mount side wall of each successive row in the sequence is greater than the respective distance from the mount side wall of a preceding row in the sequence. The terminal closure includes a plurality of receiving and securing structures at the plurality of port openings. Each receiving and securing structure receives and secures a respective drop cable that extends through a respective port opening.

Within an example, a terminal closure encloses a drop connection. The terminal closure includes a closure base partially defining an interior space of the terminal closure. The closure base includes a point of entry for a feed cable to enter into the interior space of the terminal closure. The terminal closure includes a closure cover mating with the closure base. The closure cover and the closure base define the interior space of the terminal closure. The interior space is for a drop connection. The closure cover has a port opening. The port opening provides an accessible pathway between the interior space of the terminal closure and an exterior of the terminal closure. The terminal closure includes a grommet at least partially located adjacent to the port opening. The grommet includes an internal bore to receive one of a plug or a drop cable extending through the grommet. The terminal closure includes a cap located on the closure cover. The cap corresponds to the port opening of the closure cover and the cap corresponds to the grommet. The cap is movable between an open position and a closed position. The cap applies force to the grommet during movement of the cap to the closed position such that the grommet seals the port opening.

An example terminal closure 10 in accordance with some aspects of the present disclosure is shown within FIG. 1. The terminal closure 10 includes a closure base 12. Within an example, the closure base 12 may include plastic material, resin-based material or the like. Of course, other materials (e.g., metal) are contemplated and within the scope of the present disclosure.

The terminal closure 10 is to be mounted to another, mount object (e.g., a wall of a structure, a utility pole or similar). The closure base 12 includes a back side wall 14 that is to engage against the mount object. The back side wall 14 extends in a plane. The closure base 12 includes at least one (e.g., four are present within the shown example) portion(s) 16 for receiving a fastener (e.g., a lag bolt of similar) to attach the closure base 12 to a mount object with the back side wall 14 engaged against the mount object.

The closure base 12 partially defines an interior space 20 (see for example FIG. 2) of the terminal closure 10. The closure base 12 including at least one point of entry 22 for a feed cable 24 (see FIG. 2 for an example) to enter into the interior space 20 of the terminal closure 10. Within the shown example, plural (e.g., four in the shown example) points of entry 22 are provided. Thus, it is possible that plural (e.g., four) feed cables 24 may enter into the interior space 20 of the terminal closure 10. It is to be appreciated that if less than four feed cables 24 are present, seals 26 or similar are provided for sealing the unused points of entry 22. Also, it is to be appreciated that for any feed cable 24 that is present, a grommet 28 or similar is provided for sealing the respective point of entry 22 and around the respective feed cable (see FIG. 2 for an example).

The terminal closure 10 includes a closure cover 32 (see for example FIGS. 1 and 3) that mates with the closure base 12. The closure cover 32 also partially defines the interior space 20 of the terminal closure 10. Within an example, the closure cover 32 may include plastic material, resin-based material or the like. Of course, other materials (e.g., metal) are contemplated and within the scope of the present disclosure.

Within the shown example, at least one closure clamp 34 is provided to hold/secure the closure cover 32 to the closure base 12. Within the shown example, the closure clamps 34 may include plastic material, resin-based material or the like. Of course, other materials (e.g., metal) are contemplated and within the scope of the present disclosure.

With the shown example there are seven closure clamps 34. However, a different number of clamps 34 may be provided. With the shown example, each clamp 34 is pivotally mounted on the closure base 12 and has a portion that overlaps the closure cover 32 once the closure cover mates with the closure base. Additional structures/components (e.g., a bolt and associated bolt holes) may also hold/secure the closure cover 32 to the closure base 12.

With the closure cover 32 mated with the closure base 12, the closure cover and the closure base define the interior space 20 of the terminal closure 10. Moreover, with the closure cover 32 held/secured to the closure base 12, the interior space 20 of the terminal closure 10 is to be sealed from the conditions (e.g., weather conditions such precipitation, dirt/debris, etc.) that exist at the exterior of the terminal closure. Thus, the interior space 20 may be considered to be a protected area or volume. It is to be appreciated that various structures (e.g., a contoured lip) and/or other components (e.g., seal gasket) may be provided to aid in sealing at the junction of the mating between the closure cover 32 and the closure base 12. Such possible various structures and/or components are contemplated and within the scope of the present disclosure. As is discussed further following, the protected interior space 20 provides a location for structures, connections, etc. that are thus protected from the conditions (e.g., weather conditions such precipitation, dirt/debris, etc.) that exist at the exterior of the terminal closure 10.

Figure 3:
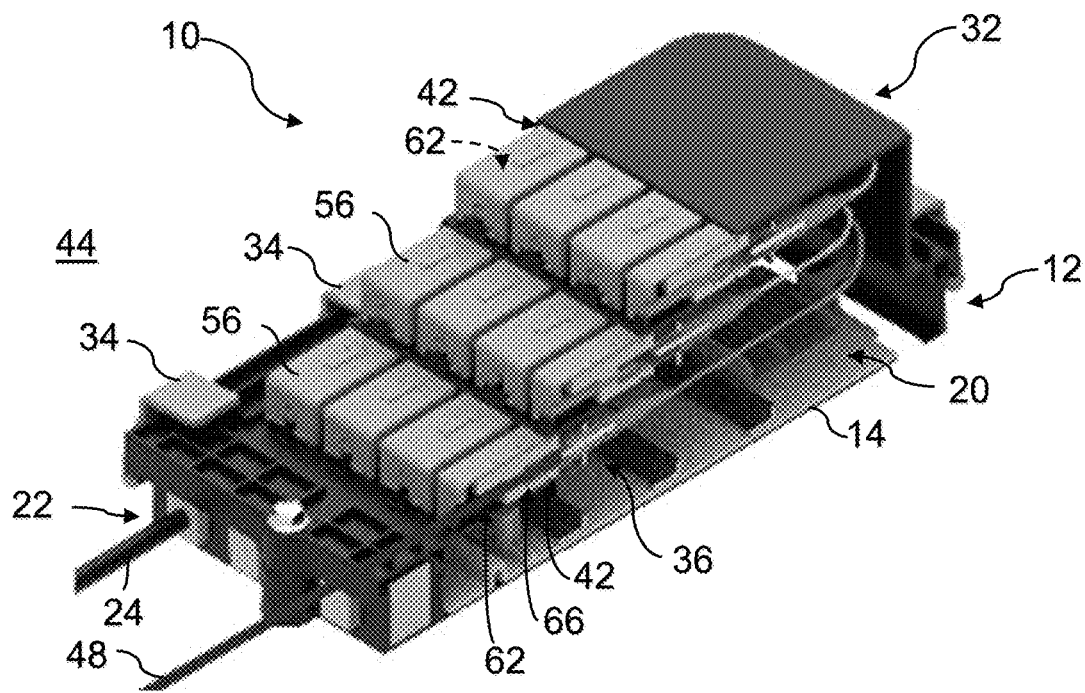
FIG. 3 is perspective, section illustration of the terminal closure of FIG. 1, taken along line 3-3 in FIG. 1, and showing some example splice loops, with the splice loops proceeding to the shown stair-step arrangement in accordance within some aspects of the present disclosure and showing some example grommets in accordance within some aspects of the present disclosure.
Figure 4:
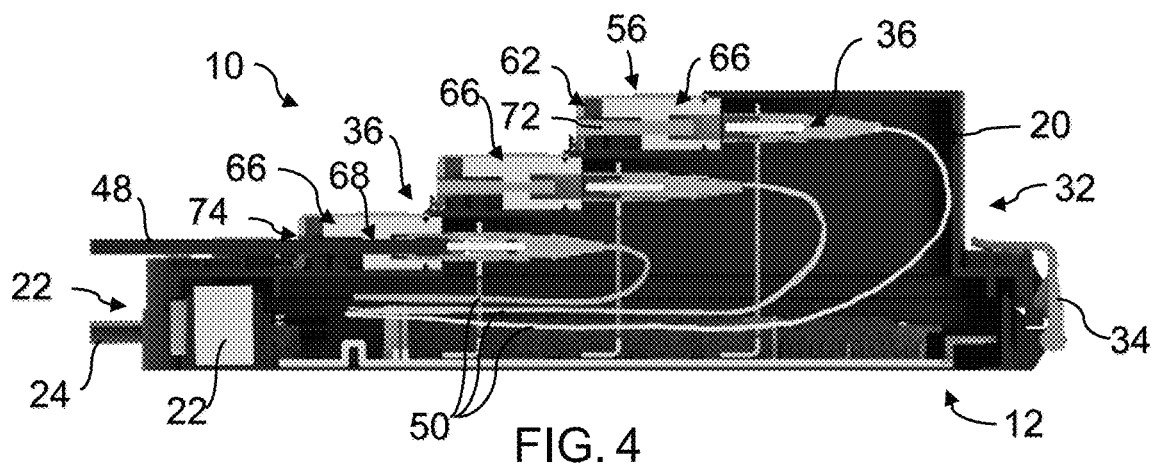
FIG. 4 is side view, section illustration of the terminal closure of FIG. 3, and showing the example splice loops and the example grommets.

The interior space 20 of the terminal closure is for at least one drop connection 36 (see for example FIGS. 3 and 4). Plural drop connections 36 may be present within the interior space 20 (i.e., inside of the terminal closure 10). Various structures, components, etc. associated with the one or more drop connections 36 may be present within the interior space 20 of the terminal closure 10. As mentioned, the drop connections 36, and/or any other structures that pare present/provided, are thus protected within the terminal closure 10. It is to be appreciated that presence/variation of the various structures, components, etc. are contemplated and within the scope of the present disclosure.

The closure cover 32 has at least one port opening 42 (see for example FIGS. 1 and 3). Within the shown example, plural (e.g., twelve) port openings 42 are provided (e.g., three rows of four opening within each row). Each port opening 42 provides an accessible pathway between the interior space 20 of the terminal closure 10 and an exterior/environment 44 outside of the terminal closure 10. Each port opening 42 is for an associated example drop cable 48 (see for example FIGS. 3 and 4) to proceed from the terminal closure 10. Herein, the port opening 42 may be referred to collective as the port openings 42, or singularly as the port opening 42 or each port opening 42. Generally, the discussions are applicable to all of the port openings 42.

At this time, it bears stating that the type, specifics, etc. of the drop cable(s) 48, the feed cable(s) 24, and the various structures, components, etc. associated with the one or more drop connections 36 that many be present within the interior space 20 of the terminal closure 10 need not be limitations upon the present disclosure. Variations are contemplated and within the scope of the present disclosure. Within an example which is shown, the drop cable(s) 48, the feed cable(s) 24, and the various associated structures, components, are fiber-optic type. However, other types, such as electrical/type, are also possible. All of such is contemplated and within the scope of the present disclosure.

Figure 2:
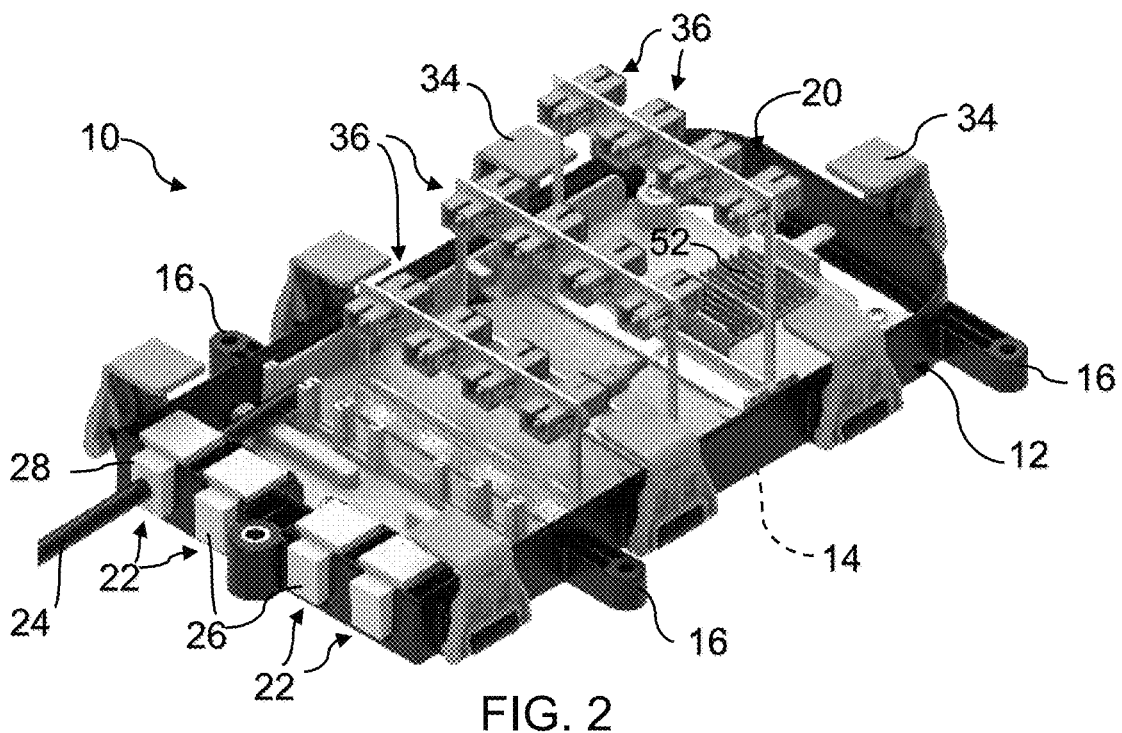
FIG. 2 is a perspective illustration of the terminal closure of FIG. 1, with some portions removed and showing an example feed cable, and showing portions associated with the example stair-step arrangement in accordance within some aspects of the present disclosure.

FIG. 2 shows some examples of various associated structures and components that may be within the interior of the terminal closure. It is to be noted that the closure cover 32 is removed within FIG. 2 for ease of seeing the shown examples of the structures and components. As mentioned, the shown example is a fiber optic example. As such, the shown example structures and components relate to fiber optics. Briefly, there are plural (e.g., twelve) fiber optic connectors, each connector providing a respective drop connection 36 for connecting a fiber from a feed cable 24 to a drop cable 48 within the protected interior space 20 of the terminal closure 10. See FIGS. 3 and 4, which show some example splice loops 50 extending from a feed cable 24 to connectors for drop cable(s) 48 or ready for a drop cable to be subsequently connected. Note that only the lower shown splice loop 50 is connected to a respective drop cable, and the middle and upper shown splice loops 50 are ready to be subsequently connected to a respective drop cable. Returning to FIG. 2, other structures, such as fiber loop arrangement/holder structures (e.g., splice holder blocks or similar) 52 may be present. Again, such shown examples are only examples. Differences, variations, etc. are contemplated and within the scope of the present disclosure. It is to be noted that the shown examples (e.g., drop connection 36 that are shown as pre-connectorized ports), are non-limiting examples. It is to be appreciated that other, different structures, components, etc. may be used. For example, traditional fusion splices (i.e., not pre-connectorized ports) may be used for connecting the fiber from a respective feed cable 24 to a respective drop cable 48. As mentioned, such examples of the contents within the terminal closure 10 would be protected.

Figure 5:
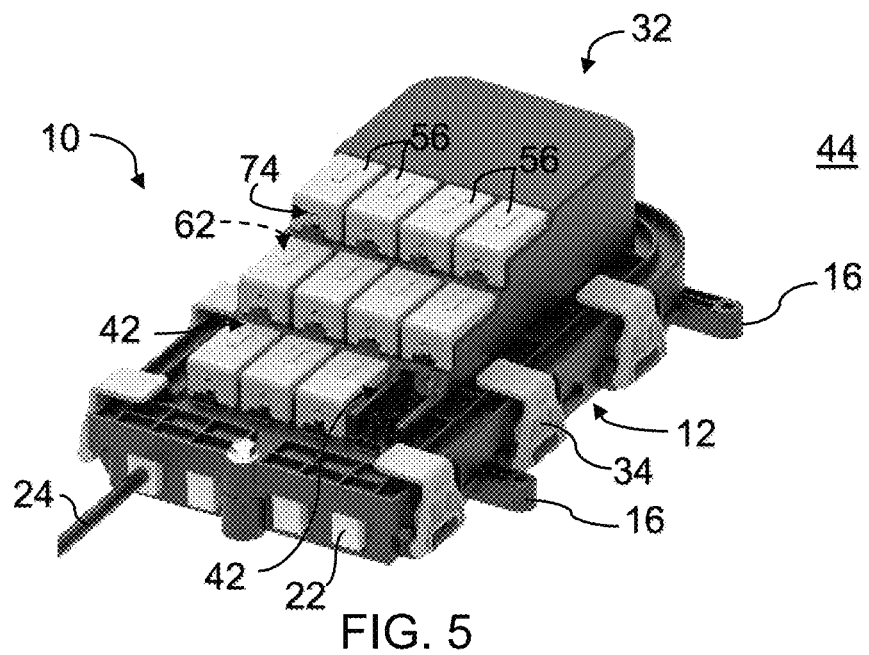
FIG. 5 is a is perspective illustration of the terminal closure of FIG. 1, with some portions removed, including one of the caps and one of the grommets to show an associated accessible pathway between an interior space of the terminal closure and an exterior of the terminal closure and also to show an awaiting connection for a drop cable.
Figure 6:
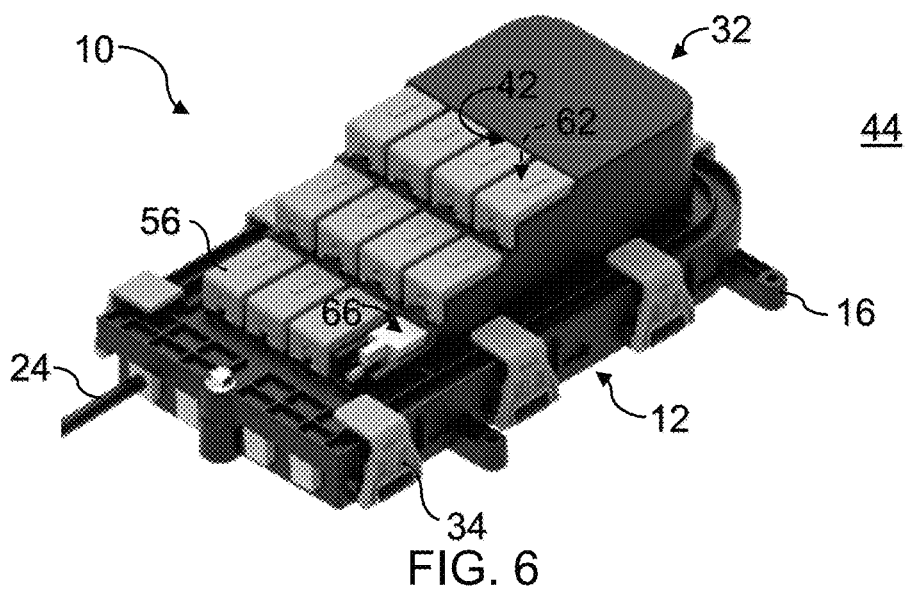
FIG. 6 is perspective illustration of the terminal closure of FIG. 1, with some portions removed, but with an example grommet in position at the associated accessible pathway visible in FIG. 5.

Focusing upon FIGS. 1, 3 and 5 for the moment, the terminal closure 10 includes at least one movable cap 56 located on the closure cover 32. Within the shown example plural (e.g., twelve) movable caps 56 are provided. The caps 56 may include plastic material, resin-based material or the like. Of course, other materials (e.g., metal) are contemplated and within the scope of the present disclosure. Herein, the caps 56 may be referred to collective as the caps 56, or singularly as the cap 56 or each cap 56. Generally, the discussions are applicable to all of the caps 56.

Each cap 56 corresponds to a respective port opening 42 of the closure cover 32. It is to be appreciated that within FIG. 1, the port openings 42 are hidden/mostly hidden under the caps 56, with such caps being shown in FIG. 1 in respective closed positions. However, an example port opening 42 is visible due to one of the caps being moved (e.g., removed) in FIG. 5.

So, it is to be appreciated that each cap 56 is movable between a respective open position and a respective closed position. Focusing upon the open position and the movement of the cap 56 to the open position, it is to be appreciated the type of movement and the type of open position may be varied and that such variations are within the scope of the present disclosure. For example, the movement may be a pivoting type movement (i.e., the cap 56 pivots relative to the rest of the closure cover 32). As another example, the movement may be a linear type movement (i.e., the cap 56 moves linearly, e.g., slides, relative to the rest of the closure cover 32). As other example, combination movements (e.g., pivoting and linear) are contemplated. It is to be appreciated that movement variations are contemplated and within the scope of the present disclosure. Further, an example type of open position may be where the cap 56 is detached from the rest of the closure cover 32. Another example type of open position may be where the cap 56 is at least partially touching/engaging some portion of the closure cover 32. Thus, here also, it is to be appreciated that variations are contemplated and within the scope of the present disclosure.

While in the closed position (i.e., within the shown example, the cap 56 is on closure cover and in the position as shown within FIGS. 1 and 3), each cap 56 and an associated portion of the closure cover 32 bound a volume 62 adjacent to the port opening 42. It is to be noted that each volume 62 is hidden beneath the respective cap 56 in FIG. 1. Herein, the volumes 62 may be referred to collective as the volumes 62, or singularly as the volume 62 or each volume 62. Generally, the discussions are applicable to all of the volumes 62.

It is to be noted that the shape of the cap 56 and the associated portion of the closure may have a variety of shapes. Such variation is contemplated and within the scope of the present disclosure. However, each respective volume 62 is nonetheless present for the variations in shapes of the cap 56 and the associated portion of the closure, with the shape of volume 62 varying accordingly. The volume 62 may be generally box-shape (e.g., having a width, height and length). Of course, specifics may be varied and also the shape can vary (not a perfect box shape, curved portions may be present, structures may be present within some portions of the volume, etc.). Such possibilities are contemplated and within the scope of the present disclosure. So, it can generally be appreciated that the volume 62 bounded by the cap 56 and the associated portion of the closure cover have at least some respective boundary dimensions (e.g., width(s), height(s), length(s), etc. and combinations thereof), but variation, etc. may be part of defining such boundary dimensions. Again, it is to be noted that each volume 62 (i.e., bounded by each respective cap 56 and the associated portion of the closure cover) is adjacent to a respective port opening 42.

As mentioned, the interior space 20 of the terminal closure 10 is to be sealed from the conditions (e.g., weather conditions such as precipitation, dirt/debris, etc.) that exist at the exterior 44 of the terminal closure. As part of such sealing, the terminal closure 10 includes at least one grommet 66 (see for example FIGS. 3 and 4) at least partially located within respective volume 62 adjacent to a respective port opening 42. Within an example, the terminal closure 10 includes a plurality of grommets 66. Within the shown example, with twelve port openings 42, twelve associated caps 56, etc., there are twelve grommets 66. Of course, it is to be appreciated that a different number of grommets 66 may be provided. Such different numbers may be associated with a different number of port openings 42, a different number of caps 56, etc. Also, such different numbers may be associated with some other structure, purpose, etc. at one or more of the port openings 42. Herein, the grommets 66 may be referred to collective as the grommets 66, or singularly as the grommet 66 or each grommet 66. Generally, the discussions are applicable to all of the grommets 66.

Figures 7, 8:
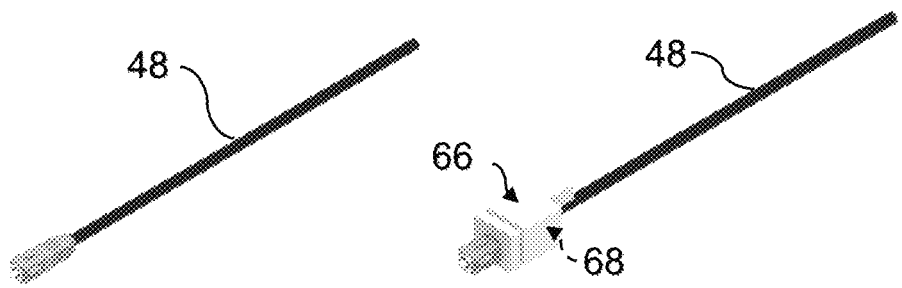
FIG. 7 is a perspective illustration of an example drop cable that may be extended into one of the accessible pathways.
FIG. 8 is a perspective illustration of the drop cable and the example grommet.

It is to be appreciated that each port opening 42 is intended to permit a coupling (e.g., via drop connection 36) of a respective drop cable 48. See for example FIG. 7, which shows an example drop cable 48. As such, each grommet 66 includes an internal bore 68 (see for example FIGS. 4 and 8) to receive a respective drop cable 48 that would extend through the grommet. Again, see for example FIG. 8, which shows the example drop cable 48, with the drop cable extending through the grommet 66. The bore 68 is sized (e.g., diameter, dimensions) so as to seal around a respective drop cable 48. Different bore sizes (e.g., diameter, dimensions) are contemplated for different cable sizes, portions sizes, etc. However, it is to be appreciated that it is possible that all available port openings 42 (e.g., twelve within the shown example) would not always have an associated drop cable 48. Thus, the bore 68 of each grommet 66 may also receive a plug 72 (see for example FIG. 4). The plug 72 is sized to mate with at least part of the bore size and seals the bore 68. It is to be appreciated that the plug 72 is removeable from, and possibly even replaceable into, the respective grommet 66. The plug may be plastic or other similar material.

Each grommet 66 has at least one outer periphery boundary dimension that is at least a large as the boundary dimension of the volume 62 bounded by the respective cap 56 and the portion of the closure cover 32 such that the grommet is sealingly engaged by the cap and the portion of the closure cover when the cap is in the closed position. In general, the grommet 66 may have a size that mirrors, mimics or similar the size of the volume 62 bounded by the respective cap 56 and the portion of the closure cover 32. It is also contemplated that the grommet 66 may have a size that has some oversizing as compared to the size of the volume 62 bounded by the respective cap 56 and the portion of the closure cover 32. It is to be appreciated that variations (e.g., size, dimension(s), etc.) in the volume 62 bounded by the respective cap 56 and the portion of the closure cover 32 would merit a corresponding change in the size of the grommet 66. Within some examples, the grommet 66 is resilient, elastically deformable or similar. For example, the grommet 66 may be made of elastomeric material, rubber, or the like.

It is to be appreciated that the sealing provided by the grommet 66 is to provide for sealing from the conditions (e.g., weather conditions such precipitation, dirt/debris, etc.) that exist at the exterior 44 of the terminal closure 10 and thus prevents such conditions from entering into the interior space 20 of the terminal closure. It is to be appreciated that the specifics of the sealing may be varied. For example, the grommet 66 may be sized so as to block the port opening 42, excepting of course the drop cable 48 that may extend through the grommet 66. Moreover, the grommet 66 may be sized such there is resilient compression of the grommet. The compression may include compression that occurs during placement of the grommet 66 at the port opening 42 (e.g., at least a portion of the grommet is compressed and inserted into the port opening). The compression may include compression that occurs when the respective cap 56 is moved to the closed position.

As indicated, the cap 56 has a relationship with the grommet 66. The cap 56 may also have a relationship with the drop cable 48. Focusing upon an example of relationship of the cap 56 and the drop cable 48, the cap may be configured for such a relationship. For example, the cap 56 may have a construction/configuration to permit extension/passage of the drop cable 48. Within the shown example, the cap has a slot 74 (see for example FIG. 4) that permits passage of the drop cable 48 from the volume 62 beneath the cap to the exterior 44. The slot 74 is aligned with the bore 68 of the grommet 66. Of course, a different configuration is contemplated dependent upon the relative positioning of the cap 56, the drop cable 48, the bore 68 of the grommet 66, etc. Thus, in general, the cap 56 and the grommet 66 are examples of some structures for receiving and securing respective drop cable 48 at the respective port opening 42.

Figure 9:
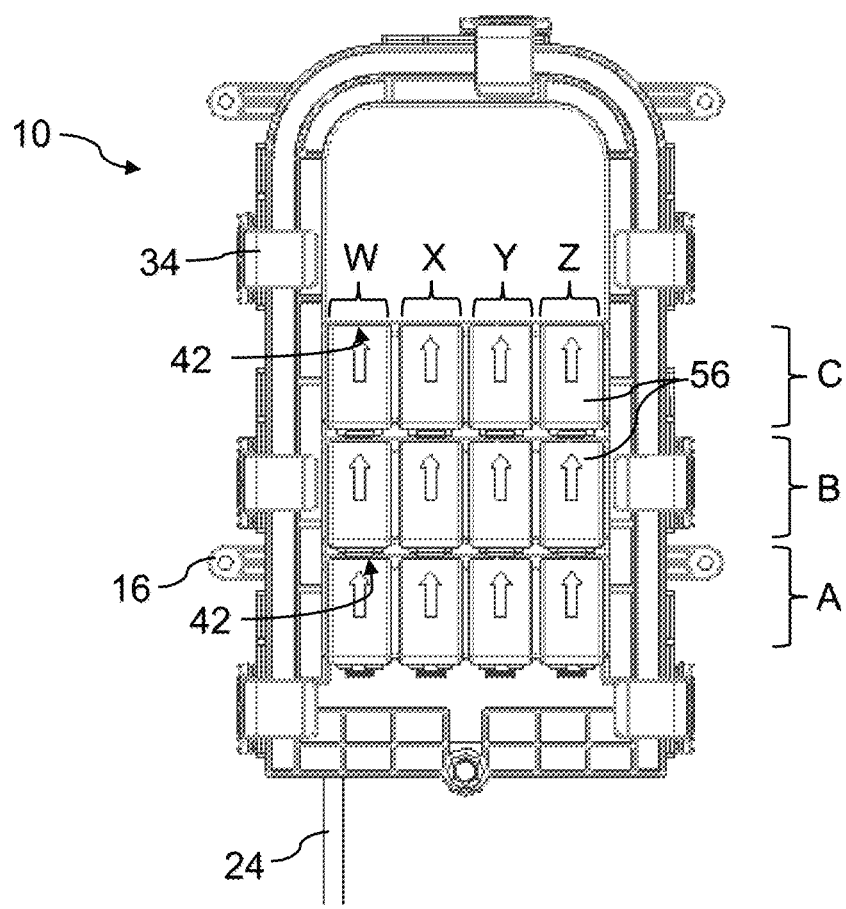
FIG. 9 is a plan view drawing of an example terminal closure in accordance within some aspects of the present disclosure and showing an example feed cable.

Turning now to FIG. 9, the terminal closure 10 is shown in a plan view. It is to be recalled that the example terminal closure 10 has the twelve port openings 42, twelve associated caps 56, etc. Within the plan view, such appears as a 3×4 matrix (i.e., three rows, A-C, and four columns, W-Z as labelled in FIG. 9). However, as is appreciated by viewing FIG. 10, all of the port openings 42, associated caps 56, etc. are not located in a single plane. As is appreciated by viewing FIG. 10, the port openings/caps/etc. of the first row A could be considered to be in a first plane, the port openings/caps/etc. of the second row B could be considered to be in a second, different plane, and the port openings/caps/etc. of the third row C could be considered to be in a third, different plane. As such the first, second and third rows A-C may be considered to have a stair step configuration/appearance. Also, for the purpose of showing such, twelve drop cables 48 are present within FIG. 10.

It is appreciated that configuration/appearance may be subject to interpretation based upon viewing perception. As such, the back side wall 14 of the closure base 12 may be used as a reference. Recall that the back side wall 14 extends in a plane. The plane of the back side wall 14 may be a reference plane. As is appreciated from viewing FIGS. 3, 4 and 10, the first row A is located at a first distance D1 from the plane of the back side wall 14, as measured perpendicular from the plane of the back side wall. The second row B is located at a second distance D2 from the plane of the back side wall 14, as measured perpendicular from the plane of the back side wall. The second distance D2 is greater than the first distance D1. The third row C is located at a third distance D3 from the plane of the back side wall 14, as measured perpendicular from the plane of the back side wall. The third distance D3 is greater than the second distance D2. Each row A-C is at a respective, different distance from the back side wall 14. Note that with the first distance D1 being the smallest, the second distance D2 being greater than the first distance D1 and the third distance D3 being greater than the second distance D2, the plurality of rows A-C proceeding in a sequence. The respective distance from the back side wall 14 of each successive row (i.e., the second row B is successive to the first row A and the third row C is successive to the second row B) in the sequence is greater than the respective distance from the back side wall 14 of a preceding row (i.e., the first row A precedes the second row B and the second row B precedes the third row C) in the sequence.

Figure 10:
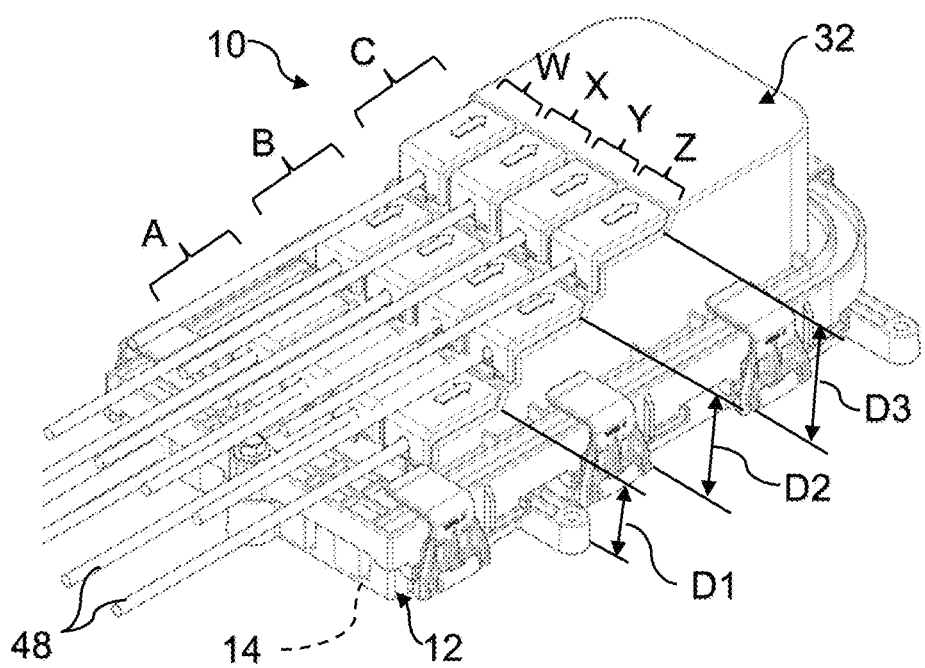
FIG. 10 is a plan view drawing of the terminal closure showing the example feed and an example plurality of drop cables, the stair-step arrangement providing an ability of drop cables from one row to overlie another row.

The stair-step arrangement may provide any of several functions, advantages, etc. For example, the stair-step arrangement may allow for improved compactness, ease of accessibility or the like. For example, see that FIG. 10 shows the twelve drop cables 48 connected to the terminal closure 10 in a relatively small/compact overall size of the terminal closure. The stair-step arrangement provides an ability for the drop cables 48 from one row (e.g., row B and/or row C) to overlie another row (e.g., row A). Specifically, the drop cables 48 from row B and/or C may overlie row A, and the drop cables 48 from row C may overlie row B and A.

So, it is to be noted that the plurality of port openings 42, associated caps 56, etc., which are arranged within the plural rows, are located such that at least one drop cable 48 associated with one of the rows overlies another row. So, it is to be noted that the plurality of port openings 42, associated caps 56, etc., which are arranged within the plural rows, are located such that a plurality of drop cables 48 overlie at least another row (e.g., row A or row B). Further, the plurality of port openings 42, associated caps 56, etc., which are arranged within the plurality of rows, are located such that at least some of the drop cables overlie at least two rows (e.g., row A and row B).

It is to be recalled that the cap 56 (e.g., each/all caps), and the associated portion of the closure cover 32, may have a variety of constructions, configurations, etc. Similarly, the grommet 66 (e.g., each/all grommets) may have a variety of constructions, configurations, etc. FIGS. 11-18 show some non-limiting examples of the cap 56, the associated portion of the closure cover 32 and the grommet 66.

Figure 11:
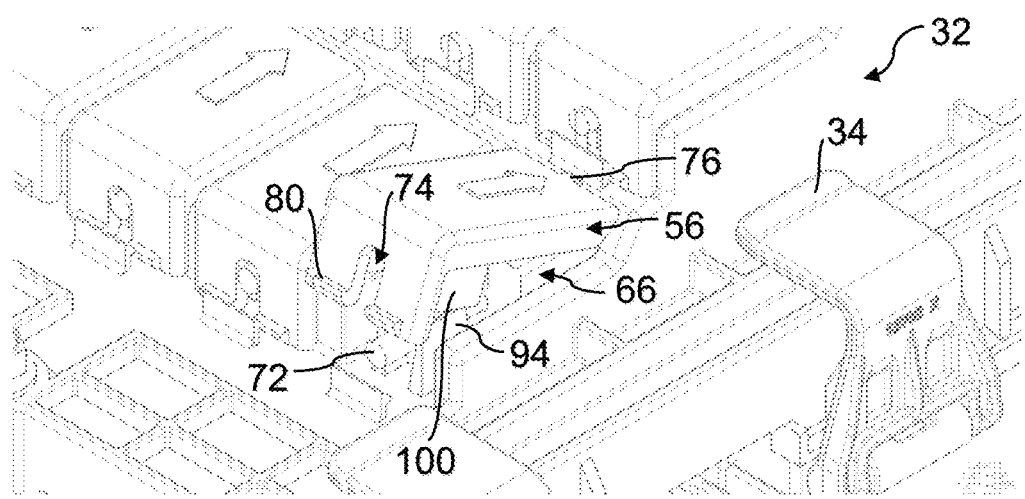
FIG. 11 is an enlarged view drawing showing some plugs located within some associated grommets, showing several example caps in respective closed positions and showing one example cap moved to a location between a closed position and an open position.
Figure 12:
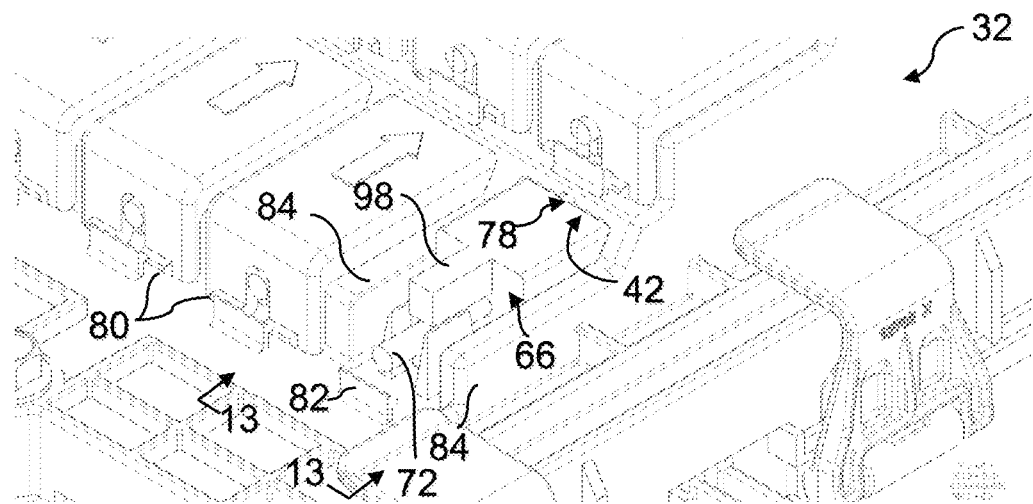
FIG. 12 is a view similar to FIG. 11, but shows the one example cap removed, which may be considered as one example of an open position, and shows a respective grommet and a respective plug therein.
Figure 13:
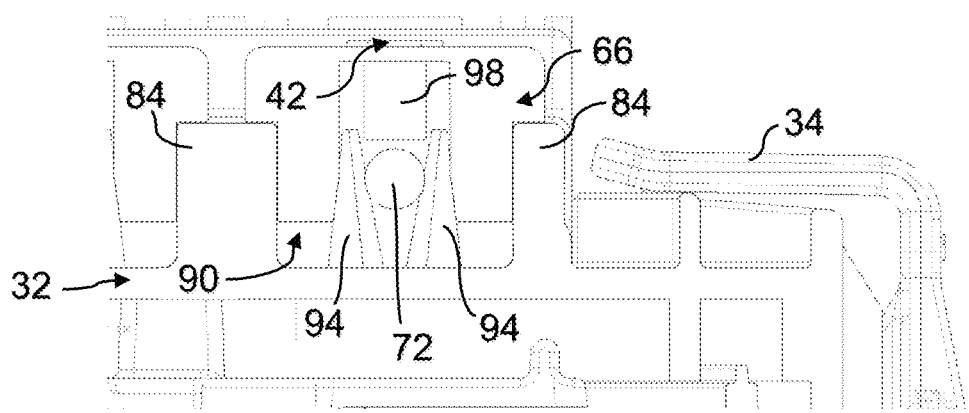
FIG. 13 is an enlarged view along line 13-13 in FIG. 12 and shows the respective plug extending into the respective grommet, which can seal the respective accessible pathway between the interior space of the terminal closure and the exterior of the terminal closure.
Figure 14:
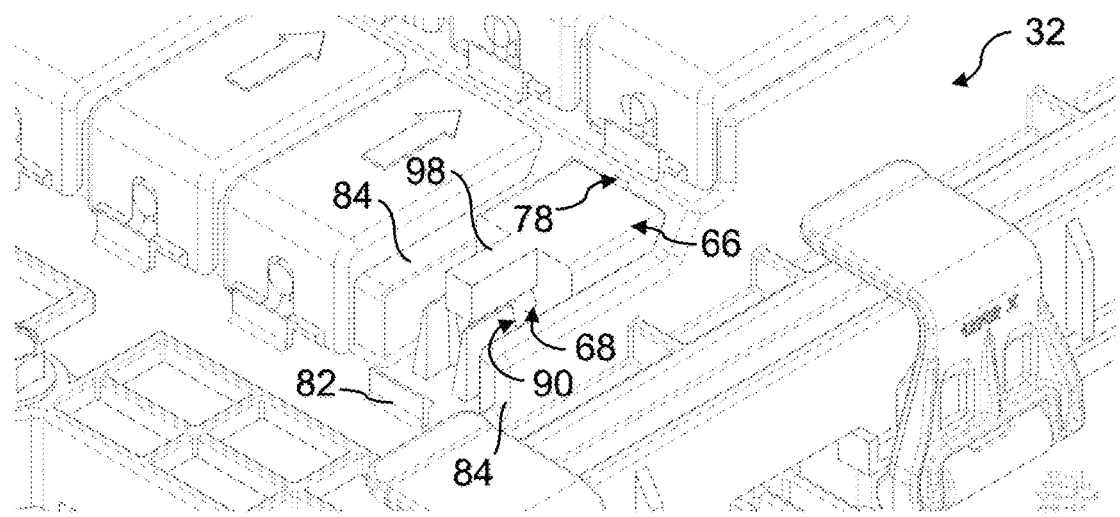
FIG. 14 is a view similar to FIG. 12, but shows the respective plug removed from the respective grommet removed, and which shows an example bore through the grommet through which an associated drop cable may extend.
Figure 15:
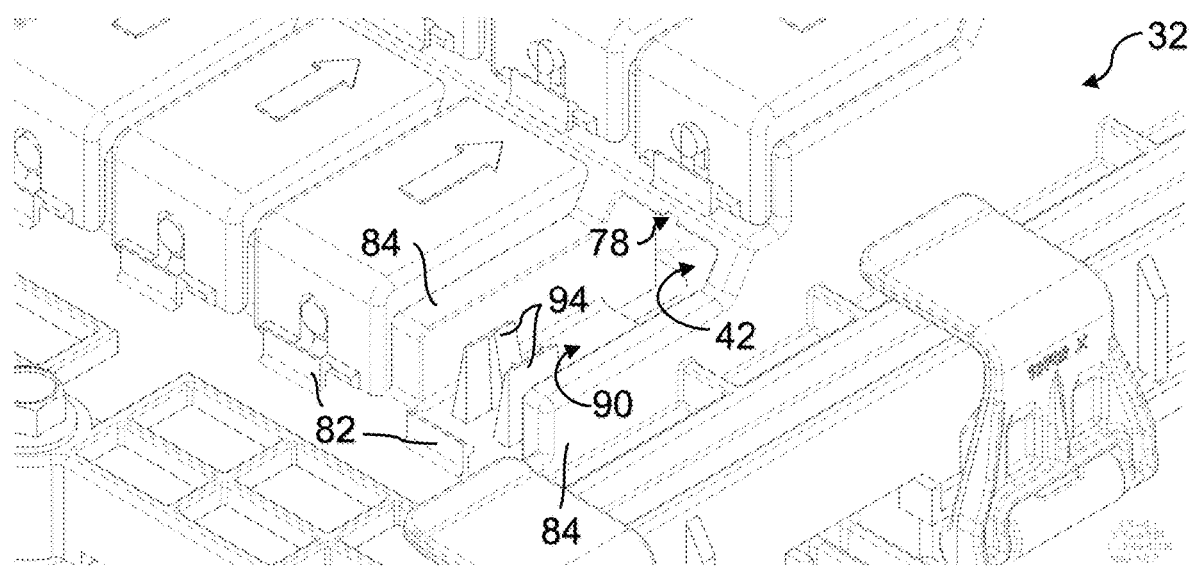
FIG. 15 is a view similar to FIG. 14, but shows the respective grommet removed, and which shows an example structure for gripping an associated drop cable, with the removal of the plug possibly being for insertion of a respective drop cable therein.
Figure 16:
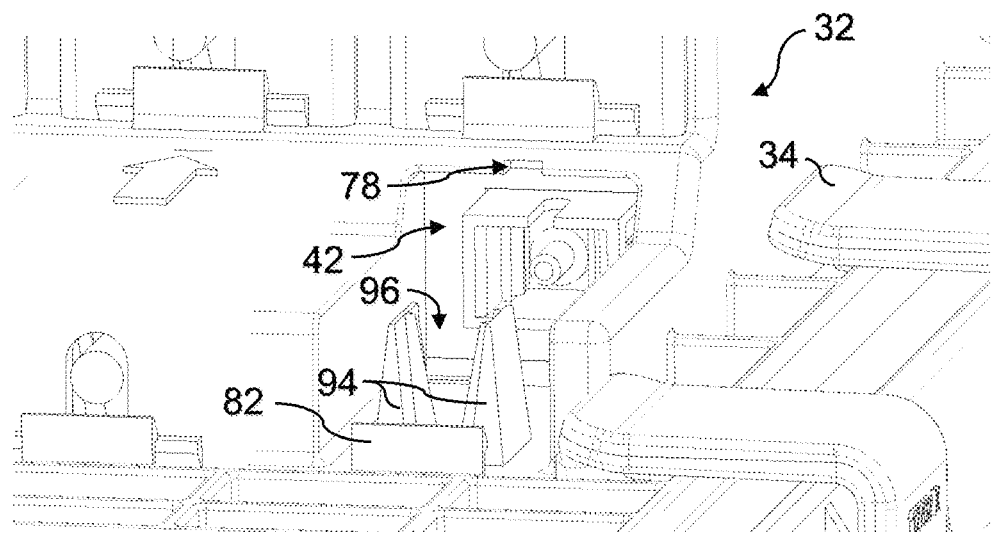
FIG. 16 is an enlarged view of a portion shown within FIG. 15, with a perspective viewing direction changed to show the awaiting connection for the associated drop cable.

Focusing upon FIGS. 11 and 12, note that the example cap 56 has a retention/pivot projection/clip 76 at an end. See also FIGS. 19 and 20. The associated portion of the closure cover (see FIGS. 15 and 16) include a receptacle 78 (e.g., a notch) for receiving the projection/clip 76 of the cap 56. As is appreciated from viewing FIG. 11, each cap 56 can pivot upward, outward as the cap is moved from the closed position to the open position. As an option, the cap 56 could simply be pivoted upward/outward as the open position. However, as mentioned removing the cap 56 (see FIG. 12), after such upward/outward movement, may also be considered the open position.

Focusing again on FIG. 11, note that the example cap 56 has lock projections/clips 80 at its other end. The associated portion of the closure cover (see FIGS. 15 and 16) include a projection 82 for engaging with and holding the lock projections/clips 80 of the cap 56. It is to be noted that the respective grommet 66 and the plug 72 therein are shown in place within FIG. 11-13 to provide sealing at the respective port opening 42.

Within the shows example of the closure cover 32, adjacent to the respective port opening 42, includes two, relatively small, side walls 84. As viewed within FIG. 13, the respective port opening 42 is located just beyond the two side walls 84. Also note that the respective port opening 42 itself is generally rectangular or square (for example see FIG. 16).

The grommet 66 has a main body portion 88 (see for example FIGS. 17 and 18) that is generally cube shaped (e.g., rectangular or square in cross-section). The main body portion 88 of the grommet 66 is shaped and sized to fit into a space volume 90 between the two side walls 84 and also fit into the respective port opening 42. It is to be appreciated that such fitting of the grommet 66 may be somewhat tight (e.g., friction fitted). Moreover, the fitting may be such that the grommet 66 is slightly larger than the space volume 90 between the two side walls 84 and also slightly larger, in cross-section, than the respective port opening 42. Such may be possible via the grommet 66 being made of resilient material, elastomeric material or the like.

It is to be appreciated that the main body portion 88 of the grommet 66 may be sized (e.g., height) to be at least as tall as the two side walls 84 or slightly larger (e.g., height-wise) than the two side walls. Such, may allow for the respective cap 56 to possibly engage, and possibly even provide compression force, against the grommet 66 when the cap is in the closed position.

For each cap 56, which corresponds to a respective port opening 42 of the closure cover 32, with the cap in the closed position, recall that there is a respective volume 62 that is adjacent to the respective port opening 42 that is bounded by the cap and an associated portion (e.g., the two walls 84, the portion between the two walls) of the closure cover. Recall that such can be referred to as the volume 62 under the closed cap 56. It is to be appreciated that the volume 62 under the closed cap 56 may be the same or at least similar to the volume 90 between the two side walls 84. Any difference between the volume 62 under the closed cap 56 and the volume 90 will dependent upon the height of the side walls, any concavity within the cap 56 possibly provided by possible side walls 92 (see FIGS. 19 and 20) of the cap, etc. For example, see that the example cap 56 includes the example side walls 92 (see for example FIGS. 19 and 20). As to be appreciated such side walls 92 may bound some of the volume 62 under the closed cap 56. Herein, is to be appreciated that the volume 62 is to be considered as being the volume 90 between the two walls 84 and also any additional volume under the closed cap 56, with an understanding that some variation may be present dependent upon presence of possible side walls 92 on the cap 56. However, it is to be appreciated that the specific volume that is utilized need not be a specific limitation upon the present disclosure. The interaction of the grommet 66 with the surfaces that may bound the volume is the aspect that is to be appreciated as discussed above and as discussed further following.

The bounded volume 90 has one or more dimension(s). As mentioned, the grommet 66 is within that volume 90. Also, the grommet 90 has one or more outer periphery boundary dimension(s) (for example, see FIGS. 17 and 18) that is/are at least a large as the respective boundary dimension(s) of the respective volume 90 bounded by each respective cap 56 and respective, associated portions (e.g., walls 84) of the closure cover 32 such that the respective grommet 66 is sealingly engaged by the respective cap 56 and the respective, associated portions (e.g., walls 84) of the closure cover 32 when the respective cap is in the closed position.

As mentioned, a respective drop cable 48 may extend through the grommet 66 and into the respective port opening 42. The grommet 66, portions (e.g., walls 84) of the closure cover 32 adjacent/near the port opening 42 and/or the cap 56 may have structure(s)/feature(s) to aid in aligning, retaining, etc. the drop cable 48 relative to the port opening 42. It is to be appreciated that any/all structure(s)/feature(s) of the grommet 66, closure cover 32 adjacent/near the port opening 42 and/or the cap 56 are optional, may be varied, other structure(s)/feature(s) may be substituted, etc. Such can be considered to be variation(s)/difference(s). Variation(s)/difference(s) are thus contemplated and within the scope of the present disclosure.

Within the shown example, the closure cover 32 may include two, upwardly extending, fingers 94 (see for example FIGS. 15 and 16) spaced a relatively small distance from the port opening 42. The two fingers 94 are located on either side of a gap 96 (see for example FIG. 16). The respective drop cable 48 may be located within the gap 96 between the fingers 94 to aid in aligning the drop cable into the port opening 42.

Also within the shown example, the two fingers 94 are tapered such that the fingers are thinner at a top and thicker toward a bottom (i.e., bottom being the connection point of each finger to the remainder of the closure cover 32). As such, the gap 96 between the fingers 94 is narrower toward the bottom. The narrowing gap 96 may provide for a wedge-type retention of the drop cable 24 as the drop cable is moved downwardly into the narrowing gap. As such the fingers 94 are an example of structure of the closure cover 32 that helps to hold the drop cable 48.

Within the shown example, the grommet 66 may include an extending finger 98 (see for example FIGS. 12-14, 17 and 18) that is located and sized to extend into the gap 96 between the two fingers 94 relatively above the drop cable 48 extending through the gap. The finger 98 of the grommet 66 may help hold the drop cable 48. As such the finger 98 is an example of structure that helps to hold the drop cable 48.

Within the shown example, the cap 56 may include two relatively downwardly extending projections 100 (see for example FIGS. 11, 19 and 20). The projections 100 of the cap 56 are located and sized such that the projections engage and bear upon the two fingers 94 of the closure cover 32. The two fingers 94 of the closure cover 32 are shaped/orientated such that there is a camming action that results in a relatively inward force upon the fingers (i.e., the fingers are pressed relatively inwardly). Inward press of the fingers 94 may aid in gripping the drop cable 48 and thus may aid in retention of the drop cable.

Figures 17, 18:
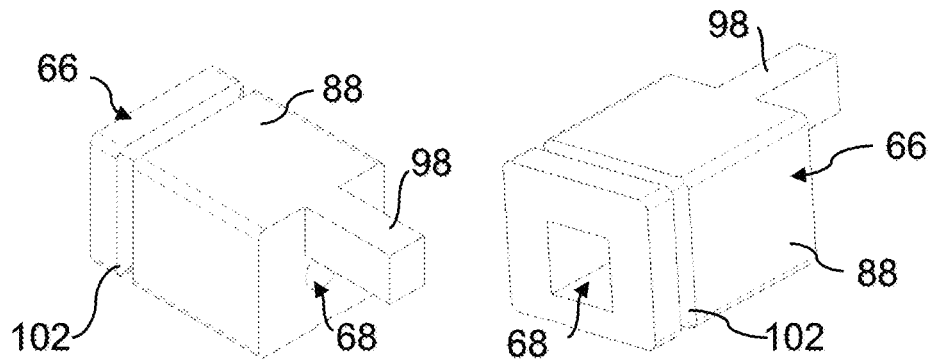
FIG. 17 is an enlarged, first reverse angle view of the example grommet.
FIG. 18 is an enlarged, second reverse angle view of the example grommet.

Also, attention is directed to FIGS. 17 and 18, which shown another optional structure/feature of the grommet 66. Specifically, the grommet 66 may include a recess 102 that circumscribes the main body portion 88 of the grommet. The recess 102 is at a location that corresponds to the grommet mating within the port opening 42 of the closure cover 32. As such, small segments of the closure cover 32 at the port opening 42 may seat into the recess 102 of the grommet 66. The seating into the recess 102 may provide for additional sealing ability.

Moreover, one of more additional recesses (not shown) may be provided on the grommet 66. Such recesses may provide various function(s) such as additional compression ability, additional sealing or the like.

It is to be appreciated that the terminal closure 10 as described above, including possible variations and the like, are to be considered non-limiting example(s), and the present disclosure need not be limited by such example(s). Other embodiments are contemplated and within the scope of the present disclosure. As an example of such further embodiments, please see FIG. 21, which shows a terminal closure 10' that includes a variation of the closure base 12'. Specifically, the closure base 12' provides for a larger interior space 20' and also has eight entry points 22' for a possible total of eight feed cables. Again, such is just a non-limiting example and other/further variations are contemplated and within the scope of the present disclosure.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or." In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes," "having," "has," "with," and/or variants thereof are used in either the detailed description or the claims, such terms are intended to be inclusive in a manner similar to the term "comprising."

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described herein should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above-described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed:

1. A terminal closure to enclose a drop connection, the terminal closure comprising:
    a closure base partially defining an interior space of the terminal closure, the closure base including a point of entry for a feed cable to enter into the interior space of the terminal closure;
    a closure cover mating with the closure base, the closure cover and the closure base defining the interior space of the terminal closure, the interior space being for a drop connection, the closure cover having a port opening, with the port opening providing an accessible pathway between the interior space of the terminal closure and an exterior of the terminal closure;
    a cap located on the closure cover, with the cap corresponding to the port opening of the closure cover, the cap being movable between an open position and a closed position, while in the closed position the cap and an associated portion of the closure cover bound a volume adjacent to the port opening, the volume bounded by the cap and the associated portion of the closure cover having a boundary dimension; and
    a grommet at least partially located within the volume adjacent to the port opening, the grommet including an internal bore to receive one of a plug or a drop cable extending through the grommet, the grommet having an outer periphery boundary dimension that is at least a large as the boundary dimension of the volume bounded by the cap and the associated portion of the closure cover such that the grommet is sealingly engaged by the cap and the associated portion of the closure cover when the cap is in the closed position.

2. The terminal closure as set forth in claim 1, wherein the port opening is a first port opening, the closure cover including a plurality of port openings, with each port opening providing a respective accessible pathway between the interior space of the terminal closure and the exterior of the terminal closure, the cap is a first cap, the terminal closure including a plurality of caps located on the closure cover, with each cap corresponding to a respective port opening of the closure cover, each cap is movable between an open position and a closed position, while in the closed position each cap and a respective, associated portion of the closure cover bounding a respective volume adjacent to the respective port opening, each respective volume bounded by each respective cap and respective, associated portion of the closure cover having a respective boundary dimension, the grommet is a first grommet, the terminal closure including a plurality of grommets, with each grommet at least partially located within a respective volume adjacent to a respective port opening, each grommet including an internal bore to receive one of a plug or a drop cable extending through the grommet, each grommet having an outer periphery boundary dimension that is at least a large as a respective boundary dimension of a respective volume bounded by each respective cap and respective, associated portion of the closure cover such that the respective grommet is sealingly engaged by the respective cap and the respective, associated portion of the closure cover when the respective cap is in the closed position.

3. The terminal closure as set forth in claim 1, wherein the open position of the cap is a removal of the cap from the closure cover.

4. The terminal closure as set forth in claim 1, wherein movement of the cap between the open position and the closed position includes pivoting movement.

5. The terminal closure as set forth in claim 1, wherein the cap provides compression force against the grommet when the cap is in the closed position.

6. The terminal closure as set forth in claim 1, wherein the closure cover includes structure that inhibits movement of the drop cable.

7. The terminal closure as set forth in claim 6, wherein the grommet includes structure that helps to hold the drop cable.

8. The terminal closure as set forth in claim 1, wherein the grommet includes a portion that mates with a portion of the closure cover at the port opening.

9. A terminal closure to enclose drop connections, the terminal closure comprising:
    a closure base partially defining an interior space of the terminal closure, the closure base including a point of entry for a feed cable to enter into the interior space of the terminal closure, the closure base including a mount side wall, the closure base including a portion for receiving a fastener to attach the closure base to a mount object with the mount side wall engaged against the mount object;
    a closure cover mating with the closure base, with the closure cover and the closure base defining the interior space of the terminal closure, the interior space being for drop connections, the closure cover having a plurality of port openings, with each port opening providing a respective accessible pathway between the interior space of the terminal closure and an exterior of the terminal closure, the plurality of port openings being arranged in a plurality of rows, each row being at a respective distance from the mount side wall, the plurality of rows proceeding in a sequence, the respective distance from the mount side wall of each successive row in the sequence being greater than the respective distance from the mount side wall of a preceding row in the sequence; and
    a plurality of receiving and securing structures at the plurality of port openings, each receiving and securing structure to receive and secure a respective drop cable extending through a respective port opening;
    wherein the plurality of receiving and securing structures include:
        a plurality of caps located on the closure cover, each cap corresponding to a respective port opening of the closure cover; and
        a plurality of grommets corresponding to a respective port opening of the closure cover, each grommet includes an internal bore to receive one of a plug or a respective drop cable extending through the grommet;
    wherein each cap is movable between an open position and a closed position, while in the closed position each cap and an associated portion of the closure cover bound a volume adjacent to the respective port opening, the volume bounded by each cap and the associated portion of the closure cover has a respective boundary dimension; and
    each grommet is at least partially located within the respective volume adjacent to the port opening, each grommet has an outer periphery boundary dimension that is at least a large as the boundary dimension of the volume bounded by the respective cap and the portion of the closure cover such that the respective grommet is sealingly engaged by the respective cap and the portion of the closure cover when the respective cap is in the closed position.

10. The terminal closure as set forth in claim 9, wherein the plurality of port openings arranged in the plurality of rows are located such that at least one drop cable associated with one of the rows overlies another row.

11. The terminal closure as set forth in claim 9, wherein the plurality of port openings arranged in the plurality of rows are located such that a plurality of the drop cables overlie at least another row.

12. The terminal closure as set forth in claim 9, wherein the plurality of port openings arranged in the plurality of rows are located such that at least some of the drop cables overlie at least two rows.

13. The terminal closure as set forth in claim 9, wherein each cap is configured with a slot to permit passage of a respective drop cable.

14. A terminal closure to enclose a drop connection, the terminal closure comprising:
   a closure base partially defining an interior space of the terminal closure, the closure base including a point of entry for a feed cable to enter into the interior space of the terminal closure;
   a closure cover mating with the closure base, with the closure cover and the closure base defining the interior space of the terminal closure, the interior space being for a drop connection, the closure cover having a port opening, with the port opening providing an accessible pathway between the interior space of the terminal closure and an exterior of the terminal closure;
   a grommet at least partially located adjacent to the port opening, the grommet including an internal bore to receive one of a plug or a drop cable extending through the grommet; and
   a cap located on the closure cover, with the cap corresponding to the port opening of the closure cover and with the cap corresponding to the grommet, the cap being movable between an open position and a closed position, the cap applying force to the grommet during movement of the cap to the closed position such that the grommet seals the port opening.

15. The terminal closure as set forth in claim 14, wherein the port opening is a first port opening, the closure cover including a plurality of port openings, with each port opening providing a respective accessible pathway between the interior space of the terminal closure and the exterior of the terminal closure, the cap is a first cap, the terminal closure including a plurality of caps located on the closure cover, with each cap corresponding to a respective port opening of the closure cover, each cap is movable between an open position and a closed position, while in the closed position each cap and a respective, associated portion of the closure cover bounding a respective volume adjacent to the respective port opening, each respective volume bounded by each respective cap and respective, associated portion of the closure cover having a respective boundary dimension, the grommet is a first grommet, the terminal closure including a plurality of grommets, with each grommet at least partially located within a respective volume adjacent to a respective port opening, each grommet including an internal bore to receive one of a plug or a drop cable extending through the grommet, each grommet having an outer periphery boundary dimension that is at least a large as a respective boundary dimension of a respective volume bounded by each respective cap and respective, associated portion of the closure cover such that the respective grommet is sealingly engaged by the respective cap and the respective, associated portion of the closure cover when the respective cap is in the closed position.

16. The terminal closure as set forth in claim 14, wherein the cap is configured with a slot to permit passage of the drop cable.

17. The terminal closure as set forth in claim 14, wherein the closure cover includes fingers spaced from the port opening for aiding in aligning the drop cable into the port opening.

18. The terminal closure as set forth in claim 17, wherein the cap includes projections that bear upon the fingers of the closure cover when the cap is moved to the closed position to aid the fingers to grip the drop cable.

* * * * *